United States Patent
Xu et al.

(10) Patent No.: US 10,027,981 B2
(45) Date of Patent: Jul. 17, 2018

(54) METHOD OF INTRA PICTURE BLOCK COPY FOR SCREEN CONTENT AND VIDEO CODING

(71) Applicant: HFI Innovation Inc., Zhubei, Hsinchu County (TW)

(72) Inventors: Xiaozhong Xu, Fremont, CA (US); Tzu-Der Chuang, Zhubei (TW); Shan Liu, San Jose, CA (US)

(73) Assignee: HFI INNOVATION INC., Zhubei, Hsinchu County (TW)

(*) Notice: Subject to any disclaimer, the term of this patent is extended or adjusted under 35 U.S.C. 154(b) by 0 days.

(21) Appl. No.: 15/505,634

(22) PCT Filed: Aug. 26, 2015

(86) PCT No.: PCT/CN2015/088085
§ 371 (c)(1),
(2) Date: Feb. 22, 2017

(87) PCT Pub. No.: WO2016/034058
PCT Pub. Date: Mar. 10, 2016

(65) Prior Publication Data
US 2017/0280159 A1     Sep. 28, 2017

Related U.S. Application Data

(60) Provisional application No. 62/044,385, filed on Sep. 1, 2014.

(51) Int. Cl.
*H04N 19/593* (2014.01)
*H04N 19/52* (2014.01)
*H04N 19/11* (2014.01)

(52) U.S. Cl.
CPC ......... *H04N 19/593* (2014.11); *H04N 19/52* (2014.11); *H04N 19/11* (2014.11)

(58) Field of Classification Search
None
See application file for complete search history.

(56) References Cited

U.S. PATENT DOCUMENTS 8,300,691 B2 * 10/2012 Lee ................. H04N 19/50
375/240.12
8,625,670 B2 * 1/2014 Lee ................. H04N 19/197
375/240.12

(Continued)

FOREIGN PATENT DOCUMENTS

CN        102223532 A       10/2011
WO      2016/029144 A1       2/2016

OTHER PUBLICATIONS

International Search Report dated Dec. 1, 2015, issued in application No. PCT/CN2015/088085.

(Continued)

*Primary Examiner* — Reza Aghevli
(74) *Attorney, Agent, or Firm* — McClure, Qualey & Rodack, LLP

(57) ABSTRACT

A method of screen content coding (SCC) and video coding using coding modes including IntraBC mode (Intra-block copy mode) is disclosed. In one embodiment, a Merge candidate list including one or more IntraBC Merge candidates and one or more Inter Merge candidates is derived. If an IntraBC Merge candidate is selected from the Merge candidate list for the current block, the current motion information of the current block is encoded or decoded by sharing candidate motion information of the selected IntraBC Merge candidate as the current motion information of the current block, and the current block is encoded or decoded using a coded block in the current picture located according to the current motion information as an IntraBC predictor. The candidate motion information or the current motion information may include one or more elements (Continued)

selected from a motion information group consisting of coding mode, displacement vector and reference picture information.

17 Claims, 4 Drawing Sheets

(56) References Cited

U.S. PATENT DOCUMENTS

| | | | |
|---|---|---|---|
| 9,118,829 B2* | 8/2015 | Ueda | H04N 5/23216 |
| 9,118,929 B2 | 8/2015 | Lin et al. | |
| 9,877,043 B2* | 1/2018 | He | H04N 19/521 |
| 2008/0192825 A1 | 8/2008 | Lee et al. | |
| 2009/0232217 A1 | 9/2009 | Lee et al. | |
| 2017/0289566 A1* | 10/2017 | He | H04N 19/52 |

OTHER PUBLICATIONS

Pang, C., et al.; "Non-RCE3: Intra Motion Compensation with 2-D MVs"; Joint Collaborative Team on Video Coding (JCT-VC) of ITU-T SG 16 WP 3 and ISO/IEC JTC 1/SC 29/WG 11; 14th Meeting: Vienna, AT, Jul. 25-Aug. 2, 2013; pp. 1-12.

Li, B., et al.; "Non-SCCE1: Unification of intra BC and inter modes;" Joint Collaborative Team on Video Coding (JCT-VC) of ITU-TSG 16 WP 3 and ISO/IEC JTC 1/SC 29/WG 11; Jun.-Jul. 2014; pp. 1-28.

Pang, C., et al.; "SCCE1: Test 3.1 Block vector prediction method for Intra block copy;" Joint Collaborative Team on Video Coding (JCT-VC) of ITU-T SG 16 WP 3 and ISO/IEC JTC 1/SC 29/WG 11; Jun.-Jul. 2014; pp. 1-8.

Joshi, R., et al.; "HEVC Screen Content Coding Draft Text 1;" Joint Collaborative Team on Video Coding (JCT-VC) of ITU-T SG 16 WP 3 and ISO/IEC JTC 1/SC 29/WG 11; Jun.-Jul. 2014; pp. 1-360.

Xu, X., et al.; ";Non-SCCE1: Default vector selection for Intra block copy BV prediction;" Joint Collaborative Team on Video Coding (JCT-VC) of ITU-T SG 16 WP 3 and ISO/IEC JTC 1/SC 29/WG 11; Jun.-Jul. 2014; pp. 1-10.

Shimizu, S., et al.; "CE1.h: View Synthesis Prediction using Forward Warping;" Joint Collaborative Team on 3D Video eroding Extension Development (JCT-VC) of ITU-T SG 16 WP 3 and ISO/IEC JTC 1/SC 29/WG 11; Jan. 2013; pp. 1-6.

Xu, X., et al.; "Non-CE2: Intra BC merge mode with default candidates;" Joint Collaborative Team on Video Coding (JCT-VC) of ITU-T SG 16 WP 3 and ISO/IEC JTC 1/SC 29/WG 11; Oct. 2014; pp. 1-7.

Pang, C., et al.; "Non-CE2: on Intra block copy;" Joint Collaborative Team on Video Coding (JCT-VC) of ITU-T SG 16 WP 3 and ISO/IEC JTC 1/SC 29/WG 11; Oct. 2014; pp. 1-5.

He, Y., et al.; "Non-CE2: Unification of IntraBC mode with inter mode;" Joint Collaborative Team on Video Coding (JCT-VC) of ITU-T SG 16 WP 3 and ISO/IEC JTC 1/SC 29/WG 11; Oct. 2014; pp. 1-8.

Li, B., et al.; "CE2: Result of Test 6;" Joint Collaborative Team on Video Coding (JCT-VC) of ITU-T SG 16 WP 3 and ISO/IEC JTC 1/SC 29/WG 11; Oct. 2014; pp. 1-11.

* cited by examiner

| Merge_idx | L0 | L1 |
|---|---|---|
| 0 | mvL0_A,ref0 | - |
| 1 | - | mvL1_B,ref0 |
| 2 | | |
| 3 | | |
| 4 | | |

310

| Merge_idx | L0 | L1 |
|---|---|---|
| 0 | mvL0_A,ref0 | |
| 1 | | mvL1_B,ref0 |
| 2 | mvL0_A,ref0 | mvL1_B,ref0 |
| 3 | | |
| 4 | | |

320

| Merge_idx | L0 | L1 |
|---|---|---|
| 0 | mvL0_A,ref0 | - |
| 1 | - | mvL1_B,ref0 |
| 2 | mvL0_A,ref0 | mvL1_B,ref0 |
| 3 | - | - |
| 4 | - | - |

410

| Merge_idx | L0 | L1 |
|---|---|---|
| 0 | mvL0_A,ref0 | |
| 1 | | mvL1_B,ref0 |
| 2 | mvL0_A,ref0 | mvL1_B,ref0 |
| 3 | (0,0), ref0 | (0,0), ref0 |
| 4 | (0,0), ref1 | (0,0), ref1 |

| Amvp_idx | L0 | | Amvp_idx | L1 |
|---|---|---|---|---|
| 0 | mvL0_A | | 0 | mvL1_A |
| 1 | mvL0_B | | 1 | - |
| 2 | - | | 2 | - |

430

| Amvp_idx | L0 | | Amvp_idx | L1 |
|---|---|---|---|---|
| 0 | mvL0_A | | 0 | mvL1_A |
| 1 | mvL0_B | | 1 | (0,0) |
| 2 | (0,0) | | 2 | - |

METHOD OF INTRA PICTURE BLOCK COPY FOR SCREEN CONTENT AND VIDEO CODING

CROSS REFERENCE TO RELATED APPLICATIONS

The present invention claims priority to U.S. Provisional Patent Application Ser. No. 62/044,385, filed on Sep. 1, 2014. The U.S. Provisional Patent Application is hereby incorporated by reference in its entirety.

TECHNICAL FIELD

The present invention relates to screen content or video coding using Intra picture block copy (IntraBC) mode. In particular, the present invention relates to predictor corresponding to Intra picture block copy (IntraBC) as a Merge or Skip candidate for screen content coding or video coding.

BACKGROUND

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition.

During the current development of range extension (RExt) or screen content coding for High Efficiency Video Coding (HEVC) standard, some tools have been adopted due to their improvements in coding efficiency for screen contents. For Intra coded blocks, Intra prediction according to the conventional approach is performed using prediction based on reconstructed pixels from neighboring blocks. Intra prediction may select one Intra prediction mode from a set of Intra Modes, which include a vertical mode, horizontal mode and various angular prediction modes. For HEVC Range Extension and screen content coding, a new Intra coding mode, named Intra picture block copy (IntraBC) has been disclosed. The IntraBC technique that was originally proposed by Budagavi in *AHG*8. *Video coding using Intra motion compensation*, Joint Collaborative Team on Video Coding (JCT-VC) of ITU-T SG 16 WP 3 and ISO/IEC JTC 1/SC 29/WG 11, 13th Meeting: Incheon, KR, 18-26 Apr. 2013, Document: JCTVC-M0350 (hereinafter JCTVC-M0350). An example according to JCTVC-M0350 is shown in FIG. 1, where a current coding unit (CU, 110) is coded using the Intra picture block copy mode. The prediction block (120) is located from the current CU and a displacement vector (112). The displacement vector is also called block vector (BV). In this example, the search area is limited to the current CTU (coding tree unit), the left CTU and the left-left CTU. The prediction block is obtained from the already reconstructed region. Then, the displacement vector and residual for the current CU are coded. It is well-known that the HEVC adopts CTU and CU block structure as basic units for coding video data. Each picture is divided into CTUs and each CTU is reclusively divided into CUs. During prediction phase, each CU may be divided into multiple blocks, named prediction units (PUs) for performing prediction process. After prediction residue is formed for each CU, the residue associated with each CU is divided into multiple blocks, named transform units (TUs) to apply transform (such as discrete cosine transform (DCT)).

In JCTVC-M0350, the IntraBC is different from the motion compensation used for Inter prediction in at least the following areas:
- BVs are restricted to be 1-D for IntraBC (i.e., either horizontal or vertical) while Inter prediction uses 2-D motion estimation.
- Binarization is fixed length for IntraBC while Inter prediction uses exponential-Golomb.
- IntraBC introduces a new syntax element to signal whether the BV is horizontal or vertical.

Based on JCTVC-M0350, some modifications are disclosed by Pang, et al., in *Non-RCE*3: *Intra Motion Compensation with* 2-*D MVs*, Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013, Document: JCTVC-N0256 (hereinafter JCTVC-N0256). Firstly, the IntraBC is extended to support 2-D MVs, so that both vertical and horizontal MV components can be non-zero at the same time. This provides more flexibility to IntraBC than the original approach, where the MV is restricted to be strictly horizontal or vertical.

In JCTVC-N0256, two BV coding methods are disclosed:
Method 1—Block vector prediction. The left or above BV is selected as the BV predictor and the resulting motion vector difference (BVD) is coded. A flag is used to indicate whether the BVD is zero. When BVD is not zero, exponential-Golomb codes of the 3rd order are used to code the remaining absolute level of the BVD. Another flag is used to code the sign.
Method 2: No block vector prediction. The BV is coded using the exponential-Golomb codes that are used for BVD in HEVC.

Another difference disclosed in JCTVC-N0256 is that the 2-D IntraBC is further combined with the pipeline friendly approach:
1. No interpolation filters are used.
2. BV search area is restricted. Two cases are disclosed:
   a. Search area is the current CTU and the left CTU or
   b. Search area is the current CTU and the rightmost 4 column samples of the left CTU.

Among the proposed methods in JCTVC-N0256, the 2-D IntraBC, the removal of interpolation filters, and the search area constraint to the current CTU and the left CTU have been adopted in a new version of draft HEVC Rext standard.

According to JCTVC-R0309 (Pang, et al., *Non-SCCE*1: *Combination of JCTVC-R*0185 *and JCTVC-R*0203, Joint Collaborative Team on Video Coding (JCT-VC) of ITU-T SG 16 WP 3 and ISO/IEC JTC 1/SC 29/WG 11, 18th Meeting: Sapporo, JP, 30 Jun.-9 Jul. 2014, Document: JCTVC-R0309 (hereinafter JCTVC-R0309)), the BV coding is modified to use the neighboring coded BVs as BV predictor (BVP). The BV predictor is derived in a way similar to the advanced motion vector prediction (AMVP) scheme in HEVC. A predictor candidate list is constructed by first checking the BV availability at spatial neighboring blocks a1 and b1 according to a priority order as shown in FIG. 2. If neither of the spatial neighbors contains block vectors, the last two coded BVs are used to fill the block vector candidate list so that the list will contain two different entries. The last two coded BVs are initialized with (−2*CU_ width, 0) and (−CU_width, 0). In order to avoid the need of a line buffer to store the previously coded BVs, any of the spatial neighboring blocks a1 and b1 and the last BVs outside the current CTU is considered unavailable. The last two coded BVs are reset to (0, 0) for each CTU to prevent the data dependency.

Also, in HEVC, Merge candidates are derived from spatial/temporal neighboring blocks for the current block coded in an Inter coded slice. A merge_flag is used to signal whether the current block is merged into one of its candidates. If merge_flag indicates the current block use Merge mode, another index is used to signal which of the candidates is used for Merge mode. For example, if candidate block a1 in FIG. 2 is signaled as the candidate to be used, then the current block will share the same motion vector (MV) and reference picture as those of block a1.

If any of the Merge candidates is not available (e.g. not existing or non-Inter coded), one or more additional candidates are inserted. If the Merge candidate list is still not full after inserting the additional candidates, a zero-valued motion vector with reference picture index (refIdx) equal to 0 will be used to fill all the empty candidates.

Two types of additional candidates can be inserted:
1. Combined bi-predictive Merge candidate (candidate type 1),
2. Zero vector Merge/AMVP candidate (candidate type 2).

The type-2 additional candidates are inserted after the type-1 additional candidates.

For type-1 candidates, combined bi-predictive Merge candidates are created by combining original Merge candidates. In particular, two candidates from the original candidates are used to create the bi-predictive Merge candidates. The original candidates may include mvL0 (the motion vector in list 0) with refIdxL0 (the reference picture index in list 0) or mvL1 (the motion vector in list 1) with refIdxL1 (the reference picture index in list 1). An example of the derivation process of combined bi-predictive Merge candidate is shown in FIG. 3A and FIG. 3B, where mvL0_A and mvL1_B are two uni-predictive Merge candidates. FIG. 3A illustrates an original Merge candidate list (310) and the Merge candidate list after adding combined candidate (320), where the added Merge candidates are highlighted by dotted background. Also, Merge index 0 is assigned to uni-predictive Merge candidate, mvL0_A, Merge index 1 is assigned to uni-predictive Merge candidate, mvL1_B and Merge index 2 is assigned to bi-predictive Merge candidate, (mvL0_A, mvL1_B). Candidate mvL0_A points to reference picture ref0 in reference list L0 and candidate mvL1_B points to reference picture ref0 in reference list L1 as shown in FIG. 3B. The two uni-predictive Merge candidates are combined into one bi-predictive Merge candidate as shown in FIG. 3B.

In type-2 candidates, zero-valued Merge/AMVP candidates are created by combining zero-valued and reference picture index which can be referred. FIG. 4A shows an example of adding zero-valued Merge candidates to the original Merge candidate list (410) to form a filled Merge candidate list (420). FIG. 4B shows an example of adding zero-valued AMVP candidates to original AMVP candidate lists (430) to form filled AMVP candidate lists (440). If zero-valued candidates are not duplicated, it is added to Merge/AMVP candidate set.

It is desirable to further improve the performance of IntraBC mode.

SUMMARY

A method of screen content coding (SCC) and video coding using one or more coding modes including IntraBC mode (Intra-block copy mode) for a picture is disclosed. In one embodiment, a first Merge candidate list including one or more IntraBC Merge candidates and one or more Inter Merge candidates is derived. If an IntraBC Merge candidate is selected from the first Merge candidate list for the current block, the current motion information of the current block is encoded or decoded by sharing candidate motion information of the selected IntraBC Merge candidate as the current motion information of the current block, and the current block is encoded or decoded using a coded block in the current picture located according to the candidate motion information of the selected IntraBC Merge candidate as an IntraBC predictor. The candidate motion information or the current motion information may include one or more elements selected from a motion information group consisting of coding mode, displacement vector and reference picture information. The coding mode may comprise IntraBC mode and Inter mode; the displacement vector may correspond to a block vector (BV) or a motion vector (MV); and the reference picture information may include a reference picture index (RefIdx), a reference picture list (RefList) or both.

The candidate motion information of each Inter Merge candidate included in the first Merge candidate list identifies one temporal reference block in one temporal reference picture in one reference list. Furthermore, if an Inter Merge candidate is selected from the first Merge candidate list for the current block, the current motion information of the current block is encoded or decoded by sharing the candidate motion information of said one Inter Merge candidate as the current motion information of the current block, and the current block is encoded or decoded using the coded block in one temporal reference picture in one reference list located according to the current motion information as an Inter predictor.

The first Merge candidate list can be derived based on one or more spatial neighboring blocks, one or more temporal blocks, or both coded either in IntraBC mode or Inter mode. Afterward, if the first Merge candidate list is not full, one or more pre-defined non-zero block vectors, one or more last coded block vectors, or both can be added to the first Merge candidate list. The non-zero block vectors may correspond to one or more elements selected from a pre-defined BV group consisting of (−W, 0), (−2W, 0), (0, −H), (0, −2H) and (−W, −H), where W and H correspond to width and height of the current block respectively. Part of or all of the pre-defined non-zero block vectors, last coded block vectors, or both can be added before bi-predictive Merge candidates, or after the bi-predictive Merge candidates and before the zero-valued Merge/AMVP (advanced motion vector predictor) candidates. Before or after the above additional candidates are added, the first Merge candidate list can be pruned to remove any redundant Merge candidate. The spatial neighboring blocks coded in the IntraBC mode can be restricted to be within a current CTU (coding tree unit) of the current block, or within the current CTU and an above-CTU above the current block. In this case, the block vectors associated with the spatial neighboring blocks coded in the IntraBC mode can be stored in a compressed form by storing one block vector for each target block size larger than a minimum block size.

The block vectors associated with the IntraBC Merge candidates can be stored by re-using the Inter motion vector buffer used to store motion vectors associated with Inter coded blocks.

When the current block is coded using the IntraBC mode, a first syntax corresponding to a Merge candidate index to select the IntraBC Merge candidate from the first Merge candidate list can be signaled at the encoder or parsed at the decoder. Similarly, when the current block is coded using the Inter mode, the first syntax corresponding to a Merge candidate index to select the Inter Merge candidate from the first Merge candidate list can be signaled at the encoder or parsed at the decoder.

When a pure IntraBC Merge candidate list is used, a syntax related to a maximum number of IntraBC Merge candidates in the first Merge candidate list can be incorporated in slice header, PPS (picture parameter set), SPS (sequence parameter set), VPS (video parameter set), slice header SCC (screen content coding) extensions, PPS SCC extensions, SPS SCC extensions, or VPS SCC extensions.

In another embodiment, if the current block is coded in IntraBC mode, a current block vector for the current block is signaled or parsed at the encoder side or the decoder side respectively. The current block vector is stored by reusing the Inter motion vector buffer used for storing motion vectors of coded blocks. When the current block vector is stored in the Inter motion vector buffer, the re-use of the Inter motion vector buffer by the current block vector can be indicated by setting a reference picture index for the current block to −1, unavailable, or a value equal to or larger than a number of reference pictures in a reference list, or setting Inter prediction direction, interDir to 0.

BRIEF DESCRIPTION OF DRAWINGS

FIG. 3A illustrates the original Merge candidate list and the Merge candidate list with additional bi-predictive candidate, and FIG. 3B illustrates the scenario of uni-predictive motion vectors and derived combined bi-predictive motion vector.

FIG. 4A and FIG. 4B illustrate an example of adding preset candidates to non-full Merge/AMVP lists according to HEVC (High Efficiency Video Coding), where FIG. 4A illustrates the case of Merge candidate list and FIG. 4B illustrates the case of AMVP candidate list.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

In the present invention, Merge candidate based on IntraBC prediction is disclosed. The Skip mode is regarded as a special case of Merge mode, where the residue of the block is zero so that there is no need to transmit the residue. Accordingly, while the following disclosure addresses the invention for the Merge mode, it is understood that the disclosure can be extended to the Skip mode. In one embodiment of the present invention, the Skip mode and Merge mode are enabled to support both Inter prediction and IntraBC prediction. For example, spatial neighboring blocks and/or temporal neighboring blocks (also referred to as temporal blocks) that are coded in either Inter mode or IntraBC mode can be considered as valid skip or merge candidates.

Mixed Use of Inter and IntraBC Merge Candidates

Figure 1:
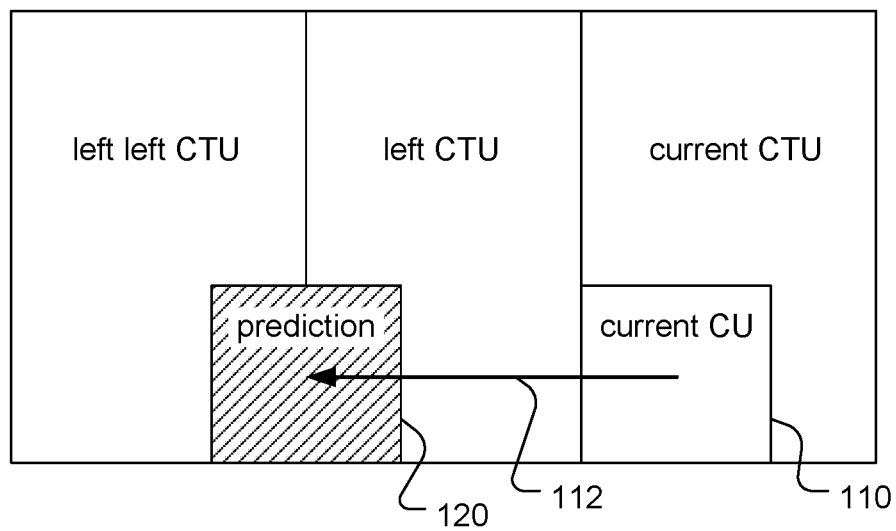
FIG. 1 illustrates an example of Intra motion compensation according to the Intra picture block copy (IntraBC) mode, where a horizontal displacement vector is used.
Figure 2:
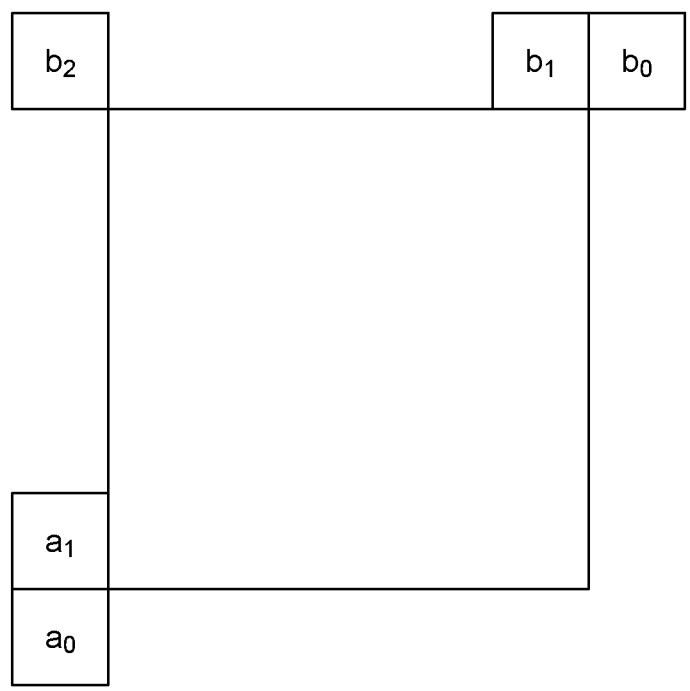
FIG. 2 illustrates an example of neighboring block configuration used to derive motion vector predictor for HEVC AMVP (High Efficiency Video Coding Advanced Motion Vector Prediction), where blocks a1 and b1 are used to derive MVP candidate for IntraBC mode according to JCTVC-R0309.
Figures 3A, 3B:
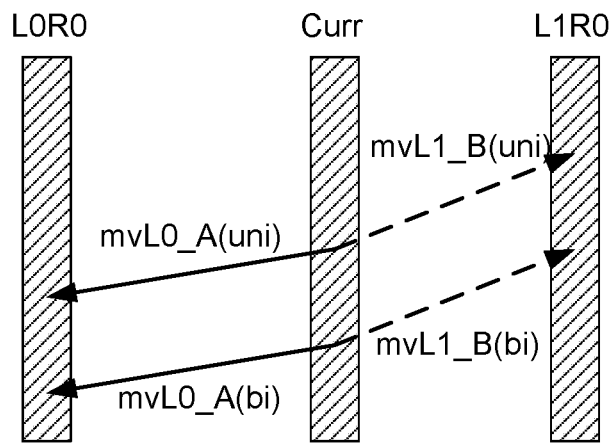
FIG. 3A and FIG. 3B illustrate an example of the derivation process of combined bi-predictive Merge candidate according to HEVC (High Efficiency Video Coding), where

When IntraBC mode is enabled for a current block, the neighboring blocks may be coded in Intra prediction mode, Inter mode or IntraBC mode. According to the present invention, one or more IntraBC Merge candidates can be used in addition to the Inter Merge candidates. The Merge candidate may be derived according to the IntraBC prediction. In the HEVC standard, when merge_flag is true (i.e., Merge mode selected), a syntax element, merge_idx is used to signal which of the Merge candidate is used for the current block to merge into. Accordingly, if the merge_idx points to a Merge candidate coded in Inter mode, the current block will share the coding mode, displacement vector and reference frame information of the candidate block. Similarly, if the merge_idx points to a Merge candidate coded in IntraBC mode, the current block will share the block vector of the candidate block. For example, in FIG. 2, if the candidate block a1 is Inter coded with MV=MV_a1, RefList=RefList_a1 and RefIdx=RefIdx_a1, and candidate block b1 is IntraBC coded with BV=BV_b1. When merge_flag is true, if merge_idx points to block a1, then the current block is Inter coded with MV=MV_a1, RefList=RefList_a1 and RefIdx=RefIdx_a1. If merge_idx points to block b1, then the current block is IntraBC coded with BV=BV_b1.

If MODE_INTRABC represents the syntax for the IntraBC prediction mode and MODE_INTER represents the syntax for Inter prediction, the prediction mode of a Merge coded block can be set to MODE_INTER or MODE_INTRABC according to the selected Merge candidate. For example, if the selected Merge candidate is an Inter coded block, the prediction mode of current block is set to MODE_INTER. If the selected Merge candidate is an IntraBC coded block, the prediction mode of current block is set to MODE_INTRABC.

If an intra_bc_flag is used to indicate whether a current block is an IntraBC coded block, the intra_bc_flag of this Merge coded block can be set to 0 or 1 according to the selected Merge candidate. For example, if the selected Merge candidate is an Inter coded block, the intra_bc_flag of current block is set to 0. If the selected Merge candidate is an IntraBC coded block, the intra_bc_flag of current block is set to 1.

In one example, signaling the IntraBC mode for the case of mixed Inter/IntraBC Merge mode can be at the PU level. The syntax for Merge mode is signaled first. If the syntax indicates that the block is not coded using Merge mode, then a syntax, intra_bc_flag is used to signal whether the non-Merge block is coded using an IntraBC mode. If it is not coded using IntraBC mode, syntax for normal Inter mode will be signaled. Exemplary syntax tables incorporating an embodiment of the present invention are shown in Table 1 and Table 2 for the CU level and PU level respectively.

TABLE 1

| | Note |
|---|---|
| coding_unit( x0, y0, log2CbSize ) { | |
|   if( transquant_bypass_enabled_flag ) | |

TABLE 1-continued

| | Note |
|---|---|
| cu_transquant_bypass_flag | |
| ~~if( slice_type != I )~~ | (1-1) |
| cu_skip_flag[ x0 ][ y0 ] | |
| nCbS = ( 1 << log2CbSize ) | |
| if( cu_skip_flag[ x0 ][ y0 ] ) | |
|     prediction_unit( x0, y0, nCbS, nCbS ) | |
| else { | |
|     ~~if( intra_block_copy_enabled_flag )~~ | (1-2) |
|         ~~intra_bc_flag[ x0 ][ y0 ]~~ | (1-3) |
| ... | |

TABLE 2

| | Note |
|---|---|
| prediction_unit( x0, y0, nPbW, nPbH ) { | |
|   if( cu_skip_flag[ x0 ][ y0 ] ) { | |
|     if( MaxNumMergeCand > 1 ) | |
|       merge_idx[ x0 ][ y0 ] | |
|   } else { | |
|     merge_flag[ x0 ][ y0 ] | (2-1) |
|     if( merge_flag[ x0 ][ y0 ] ) { | |
|       if( MaxNumMergeCand > 1 ) | |
|         merge_idx[ x0 ][ y0 ] | |
|     } else {/* non merge IntraBC mode syntax*/ | (2-2) |
|       intra_bc_flag | (2-3) |
|       if( intra_bc_flag ) { | (2-4) |
|         bvd_coding( x0, y0, 2 ) | |
|         bvp_flag[ x0 ][ y0 ] | |
|       } else { /* non Merge Inter mode syntax*/ | (2-5) |
|         ... | (2-6) |
|     } | |
|   } | |
| } | |

Table 1 illustrates one example of changes at the CU level from the conventional syntax table according to one embodiment, where the double-strikethrough indicates deletion. The conventional coding only allows Skip mode for Inter coded CU. Since the Skip mode is treated as a special case of Merge mode and the Merge mode may be used for an IntraBC coded block, the syntax line to check for non-Intra CU as indicated by note (1-1) is deleted. The IntraBC mode flag is moved from the CU level to the PU level in this example. Accordingly, the syntax lines as indicated in (1-2) and (1-3) are also deleted.

Table 2 illustrates one example of changes at the PU level from the conventional syntax table according to one embodiment. The location of merge_flag is indicated by note (2-1). When a non-Merge mode (i.e., the "else" path) as indicated by note (2-2) is used, intra_bc_flag is incorporated as indicated by note (2-3). The value of intra_bc_flag is checked as indicated in note (2-4). If the PU is not IntraBC coded (i.e., the "else" path) as indicated by note (2-5), syntax for Inter mode follows (shown as " . . . ") as indicated by note (2-6).

In another example, signaling the IntraBC mode can be at the CU level, the exemplary syntax tables for the CU level and PU level are shown in Table 3 and Table 4 respectively.

TABLE 3

| | Note |
|---|---|
| coding_unit( x0, y0, log2CbSize ) { | |
|   if( transquant_bypass_enabled_flag ) | |
|     cu_transquant_bypass_flag | |
|   ~~if( slice_type != I )~~ | (3-1) |
|     cu_skip_flag[ x0 ][ y0 ] | |

TABLE 3-continued

| | Note |
|---|---|
|   nCbS = ( 1 << log2CbSize ) | |
|   if( cu_skip_flag[ x0 ][ y0 ] ) | |
|     prediction_unit( x0, y0, nCbS, nCbS ) | |
|   else { | |
|     if( intra_block_copy_enabled_flag ) | (3-2) |
|       intra_bc_flag[ x0 ][ y0 ] | (3-3) |
|   ... | |

TABLE 4

| | Note |
|---|---|
| prediction_unit( x0, y0, nPbW, nPbH ) { | |
|   if( cu_skip_flag[ x0 ][ y0 ] ) { | (4-1) |
|     if( MaxNumMergeCand > 1 ) | |
|       merge_idx[ x0 ][ y0 ] | |
|   } else if( intra_bc_flag ) { /* MODE_INTRABC */ | (4-2) |
|     merge_flag[ x0 ][ y0 ] | (4-3) |
|     if( merge_flag[ x0 ][ y0 ] ) { | (4-4) |
|       if( MaxNumMergeCand > 1 ) | (4-5) |
|         merge_idx[ x0 ][ y0 ] | (4-6) |
|     }else{ | (4-7) |
|       bvd_coding( x0, y0, 2 ) | (4-8) |
|       bvp_flag[ x0 ][ y0 ] | (4-9) |
|     } | |
|   }else{/* MODE_INTER */ | (4-10) |
|     merge_flag[ x0 ][ y0 ] | |
|     if( merge_flag[ x0 ][ y0 ] ) { | |
|       if( MaxNumMergeCand > 1 ) | |
|         merge_idx[ x0 ][ y0 ] | |
|     } else { | |
|       ... | |

Table 3 illustrates one example of changes at the CU level from the conventional syntax table according to one embodiment, where the double-strikethrough indicates deletion. Table 3 is similar to Table 1. The syntax line to check for non-Intra CU as indicated by note (3-1) is deleted. The IntraBC mode flag stays in the CU level as indicated in (3-2) and (3-3).

Table 4 illustrates one example of changes at the CU level from the conventional syntax table according to one embodiment. In the syntax line indicated by note (4-1), whether the CU is coded in the Skip mode is checked. If the CU is not coded in the Skip mode and the IntraBC mode is enabled as indicated by note (4-2), a Merge flag, merge_flag[x0][y0] is included as indicated by note (4-3). If merge_flag[x0][y0] is equal to 1 as indicated by note (4-4), information related to the IntraBC Merge candidate is included as indicated by notes (4-5) and (4-6). If merge_flag[x0][y0] is equal to 0 (i.e., the "else" path as indicated by note (4-7)), information related to BV coding is included as indicated by notes (4-8) and (4-9). The syntax lines from notes (4-3) to (4-7) correspond to an example of additional syntax lines to support the embodiment of the present invention.

In the example shown in Table 3 and Table 4, if the intra_bc_flag is explicitly signaled as 1, the Merge mode can be a pure IntraBC Merge mode and the Merge list includes no Inter candidate. That means for the Merge candidate derivation, only the BVs of IntraBC coded blocks are used as Merge candidate. The MVs of Inter coded blocks are treated as unavailable. If the prediction mode is explicitly signaled as MODE_INTER (i.e., the syntax line as indicated by note (4-10)), the Merge mode can be Inter Merge mode alone. Note that, the SKIP mode is still mixed Inter/IntraBC Skip mode.

In another example, the use of IntraBC mode is signaled at CU level. Table 5 and Table 6 illustrate exemplary syntax tables for the CU level and PU level respectively, where the Merge mode is signaled under intra_bc_flag=1 in an I-slice. In P-slice or B-slice, the Merge mode syntax is the same as Inter Merge mode coding. If current block is coded in the IntraBC coded Merge mode, the corresponding syntax element will be parsed under the MODE_INTER prediction mode since IntraBC coding is treated as an Inter mode according to an embodiment of the present invention. However, the prediction mode will be set to MODE_INTRABC or the intra_bc_flag will be set to 1 if the selected Merge candidate is IntraBC coded block.

TABLE 5

|  | Note |
| --- | --- |
| coding_unit( x0, y0, log2CbSize ) { | |
| if( transquant_bypass_enabled_flag ) | |
| cu_transquant_bypass_flag | |
| if( slice_type != I ) | (3-1) |
| cu_skip_flag[ x0 ][ y0 ] | |
| nCbS = ( 1 << log2CbSize ) | |
| if( cu_skip_flag[ x0 ][ y0 ] ) | |
| prediction_unit( x0, y0, nCbS, nCbS ) | |
| else { | |
| if( intra_block_copy_enabled_flag ) | (3-2) |
| intra_bc_flag[ x0 ][ y0 ] | (3-3) |
| ... | |

TABLE 6

|  | Note |
| --- | --- |
| prediction_unit( x0, y0, nPbW, nPbH ) { | |
| if( cu_skip_flag[ x0 ][ y0 ] ) { | (4-1) |
| if( MaxNumMergeCand > 1 ) | |
| merge_idx[ x0 ][ y0 ] | |
| } else if( intra_bc_flag ) { /* MODE_INTRABC */ | (4-2) |
| if(slice_type == I_SLICE) | (6-1) |
| merge_flag[ x0 ][ y0 ] | (4-3) |
| if( merge_flag[ x0 ][ y0 ] && slice_type == I_SLICE) ] | (4-4) |
| if( MaxNumMergeCand > 1 ) | (4-5) |
| merge_idx[ x0 ][ y0 ] | (4-6) |
| }else{ | (4-7) |
| bvd_coding( x0, y0, 2 ) | (4-8) |
| bvp_flag[ x0 ][ y0 ] | (4-9) |
| } | |
| }else{/* MODE_INTER */ | (4-10) |
| merge_flag[ x0 ][ y0 ] | |
| if( merge_flag[ x0 ][ y0 ] ){ | |
| if( MaxNumMergeCand > 1 ) | |
| merge_idx[ x0 ][ y0 ] | |
| } else { | |
| ... | |

Table 5 is the same as Table 3. Table 6 is similar to Table 4. However, the Merge flag, merge_flag[x0][y0] is included as indicated by note (4-3) only when the condition, "if(slice type==I_SLICE)" is true as indicated by note (6-1).

In the embodiments as disclosed above, the Skip mode can be applied to Intra slice as well, where all the valid Merge candidates in Skip and Merge modes are also used for IntraBC coded blocks in the Intra slice.

Merge Candidate List Construction

Another aspect of the present invention addresses Merge candidate list construction. In embodiments of the present invention, preset values are used as default IntraBC Merge candidates when the Merge candidate list is not full.

Furthermore, pruning process can be used according to embodiments of the present invention during the Merge candidate construction. Some or all of the duplicated candidate values will be removed. When there are not enough candidates to fill the Merge candidate list, conventional approaches often use (0, 0) motion vector to fill the list. However, this zero-valued BV is not useful for IntraBC prediction. Accordingly, embodiments of the present invention use non-zero-valued BVs (also named as non-zero BVs) as additional Merge candidates to fill the candidate list. When the merge_idx points to one of these additional candidates, the current block will be coded in the IntraBC mode and share the BV of the Merge candidate pointed by merge_idx.

In one embodiment, the preset values of the non-zero-valued BVs are determined according to the block size. For example, the preset values of the non-zero-valued BVs correspond to an ordered set, {(−W, 0), (−2W, 0), (0, −H), (0, −2H), (−W, −H)}, where W and H refer to the width and height of the current prediction block or the current coding unit. In the above example, candidate (−W, 0) will be inserted to the Merge list if the list is not full. After the first member is added to the Merge list, if the list is still not full, the second element in the ordered set, i.e., (−2W, 0) will be added to the list. In another embodiment, the preset values of the non-zero-valued BVs correspond to an ordered set, {(−2W, 0), (−W, 0), (0, −2H), (0, −H), (−W, −H)}

In another embodiment, N last coded BVs can also be used to fill the candidate list. For example, N can be equal to 1, 2, 3, etc.

In yet another embodiment, both N last coded BVs and preset values can be used at the same time to fill the candidate list. For example, the order set corresponding to {first last coded BV, second last coded BV, (−W, 0), (−2W, 0), (0, −H)} or {first last coded BV, second last coded BV, (−2W, 0), (−W, 0), (0, −2H)} can be used. In these two examples, the maximum number of Merge candidates is assumed to be 5. In yet another example, the last coded BVs can be placed after the preset BVs.

The last coded BVs might already be put into the Merge candidate list if the candidate happens to be a coded BV of a neighboring block of the current block. The pruning processes can be applied on the last coded BVs to remove the redundant candidates. For example, the last coded BVs can be compared with the IntraBC coded candidates that already in the candidate list. The redundant last coded BVs can be removed. The same pruning method can be applied to the preset BVs (e.g. (−W, 0), (−2W, 0), (0, −H), (0, −2H), (−W, −H)).

During adding one or more additional Merge candidates to fill the Merge list, part or all of additional Merge candidate(s) can be inserted before or after the combined bi-predictive Merge candidates of the type-1 as additional candidates. For example, the preset BVs corresponding to (−2W, 0) and (−W, 0) can be inserted before the combined bi-predictive Merge candidate.

Part of or all of the filling BV candidates mentioned above can be inserted into the Merge list after the type-1 additional candidates and before the type-2 additional candidates. For example, the BVs corresponding to (−2W, 0) and (−W, 0) can be inserted after the type-1 additional candidates and before the type-2 additional candidates. Part of or all of the filling BV candidates mentioned above may also be inserted into the Merge list after part of the type-2 additional candidates. For example, the BVs corresponding to (−2W, 0) and (−W, 0) can be inserted after the first type-2 additional candidate.

Part of or all of the filling BV candidates mentioned above can be inserted after the type-2 additional candidates and before the zero-valued motion vector with reference picture index (refIdx) equal to 0. For example, the BVs corresponding to (−2W, 0) and (−W, 0) can be inserted after the type-2 additional candidates. Part of or all of the filling BV candidates can be used to replace the type-2 additional candidates.

The filling BV candidates as mentioned above can be applied in I-slice only. While the disclosure mentioned above uses the preset non-zero BVs or last coded BVs as additional Merge candidate along with the type-1 and/or type-2 additional candidates in I-slice, the type-1 and/or type-2 additional candidates can also be removed.

In type-1 additional candidate derivation, the IntraBC coded BV can be excluded for generating the combined Merge candidates. For example, if the Merge candidate 0 is IntraBC coded BV, it won't be used to generate combined Merge candidates.

In the conventional art, the temporal candidate in a collocated picture can be used in Merge mode and AMVP mode for Inter coded block. In the Merge candidate and AMVP MV predictor derivation, the IntraBC coded block is treated as unavailable. However, in an embodiment of the present invention, the BV of IntraBC coded block in the collocated picture is used as one of the Merge candidates or BV predictor. For example, if the temporal Inter candidates are unavailable, the available temporal IntraBC candidates are included. The position of the temporal IntraBC candidate in the collocated picture can be the same as the position of the temporal Inter candidate in the collocated picture.

Since some BVs may not be valid BVs, the invalid BVs can be excluded from the Merge candidate derivation. For example, the BVs equal to (0, 0), or the BVs pointing to outside of current picture, an area not yet decoded or a decoded area within the same coding unit are not valid BVs. Such BVs can be removed from the candidate Merge list.

The spatial neighboring Merge candidates coded in the IntraBC mode can be treated as available without any constraints. However, the spatial neighboring Merge candidates coded in the IntraBC mode from above the current block can be constrained to be within the current CTU. If the candidate is from the CTU above the current block, it is treated as unavailable. This restriction on the neighboring candidates to the same CTU can relieve the requirement to store the candidates from the CTU row above the current block. In yet another embodiment, the neighboring candidate block from above current block is constrained to the CTU above the current block. When this constraint is imposed, the coded BVs associated with the above CTU row are stored in a compressed form. For example, the BVs can be stored for a larger block size to achieve compression. Accordingly, the smallest block to have an individual BV value will no longer be 4×4. For example, the BVs can be stored at a larger block size such as 16×16. Accordingly, the above CTU row will only store BV values for each 16×16 block in this example.

The above mentioned constraints can be applied adaptively according to the slice type. For example, for an Intra slice, the spatial candidates for Skip, Merge, and/or IntraBC mode are treated as unavailable if the spatial candidates are from the CTU above the current block. On the other hand, for an Inter slice, the spatial candidates for Skip, Merge, and/or IntraBC mode do not have such constraints. In another example, the coded BVs for the Intra slice can be stored for a larger block size as a form of compressed format. When a spatial candidate is located in the CTU above the current one and overlap with the location of a stored BV, the stored BV can be used as the BV for this candidate and can be used as Merge candidate. The coded BVs in the Inter slice, however, may or may not be subject to such compression.

IntraBC Merge Candidate Number Signaling

Another aspect of the present invention addresses IntraBC Merge candidate number signaling. In HEVC, the maximum candidate number of Inter Merge is signaled in the slice header according to the syntax, five_minus_max_num_merge_cand. In one embodiment, the maximum number of IntraBC Merge candidates can be signaled in the slice header, PPS (picture parameter set), SPS (sequence parameter set), VPS (video parameter set), slice header SCC (screen content coding) extensions, PPS SCC extensions, SPS SCC extensions, or VPS SCC extensions. For example, a syntax, five_minus_max_num_intra_bc_merge_cand can be signaled to indicate the maximum number of IntraBC Merge candidates supported minus 5.

Reuse Inter MV Buffer for Block Copy Vector Storage

Another aspect of the present invention addresses reuse Inter MV buffer for block copy vector storage. In the IntraBC mode, the BV used to indicate a predictor block in the current frame may need to be stored. Therefore, the BVs will require additional buffers for storing the BVs. In one embodiment, the stored BV can be used as the IntraBC Merge candidate for a later coded block.

According to one embodiment of the present invention, the Inter MV buffer (including the MV buffer and refIdx buffer) is reused to store the BVs. For example, if a BV equal to (x, y) is stored in the Inter MV buffer, the corresponding refIdx (i.e., reference picture index) can be set to −1, unavailable, or a value larger than or equal to the number of reference frame in this list. Therefore, this refIdx will indicate that the reference picture index is for an IntraBC coded picture. Alternatively, the interDir (i.e., Inter prediction direction) can be set to 0 and store the MV equal to (x,y) for the BV of the IntraBC mode.

The performance of a video coding system with Merge mode including one or more IntraBC Merge candidate according to the present invention is compared to the performance of a conventional system as shown in Table 7 and Table 8 under various system configurations (i.e., All Intra (AI), Random Access (RA) and Low Delay B Picture (LB)). The conventional system corresponds to the system based on HEVC Screen Content Coding Test Model 2 (SCM 2). The system incorporating an embodiment of the present invention for Table 7 corresponds to a system using a Merge candidate list including mixed IntraBC candidate(s) and Inter candidates. The system incorporating an embodiment of the present invention for Table 8 corresponds to a system using a Merge candidate list including mixed IntraBC candidate(s) and Inter candidates and inserting preset non-zero BVs and two BVs from last coded IntraBC blocks. A negative value in the BD-rate implies that the present invention has a better performance. As shown in Table 7, the present invention may achieve as high as 5.5%. As shown in Table 8, the present invention may achieve as high as 7.0%. Therefore, the improvement over the convention approach is substantial.

TABLE 7

| Anchor: SCM2.0 | AI | RA | LB |
|---|---|---|---|
| RGB, text & graphics with motion, 1080p | −4.5% | −5.3% | −5.5% |
| RGB, text & graphics with motion, 720p | −2.4% | −2.1% | −1.6% |
| RGB, mixed content, 1440p | −2.3% | −1.9% | −1.6% |
| RGB, mixed content, 1080p | −2.0% | −2.0% | −1.9% |

TABLE 7-continued

| Anchor: SCM2.0 | AI | RA | LB |
|---|---|---|---|
| RGB, Animation, 720p | −0.1% | 0.0% | −0.1% |
| RGB, camera captured, 1080p | 0.1% | 0.0% | 0.0% |
| YUV, text & graphics with motion, 1080p | −2.4% | −4.8% | −5.3% |
| YUV, text & graphics with motion, 720p | −1.7% | −1.6% | −1.6% |
| YUV, mixed content, 1440p | −1.7% | −1.6% | −1.5% |
| YUV, mixed content, 1080p | −1.6% | −1.7% | −1.6% |
| YUV, Animation, 720p | −0.1% | 0.0% | 0.0% |
| YUV, camera captured, 1080p | 0.1% | 0.0% | 0.0% |
| Enc Time[%] | 120% | 103% | 102% |
| Dec Time[%] | 98% | 97% | 98% |

TABLE 8

| Anchor: SCM2.0 | AI | RA | LB |
|---|---|---|---|
| RGB, text & graphics with motion, 1080p | −5.3% | −6.7% | −7.0% |
| RGB, text & graphics with motion, 720p | −3.0% | −2.5% | −2.0% |
| RGB, mixed content, 1440p | −2.9% | −2.4% | −2.2% |
| RGB, mixed content, 1080p | −2.6% | −2.4% | −2.1% |
| RGB, Animation, 720p | −0.2% | 0.2% | 0.1% |
| RGB, camera captured, 1080p | 0.0% | 0.2% | 0.1% |
| YUV, text & graphics with motion, 1080p | −3.4% | −6.3% | −6.9% |
| YUV, text & graphics with motion, 720p | −2.7% | −2.3% | −2.1% |
| YUV, mixed content, 1440p | −2.3% | −2.1% | −2.2% |
| YUV, mixed content, 1080p | −2.3% | −2.3% | −2.6% |
| YUV, Animation, 720p | −0.3% | 0.0% | 0.3% |
| YUV, camera captured, 1080p | 0.0% | 0.1% | 0.1% |
| Enc Time[%] | 119% | 101% | 103% |
| Dec Time[%] | 95% | 95% | 99% |

Figure 5:
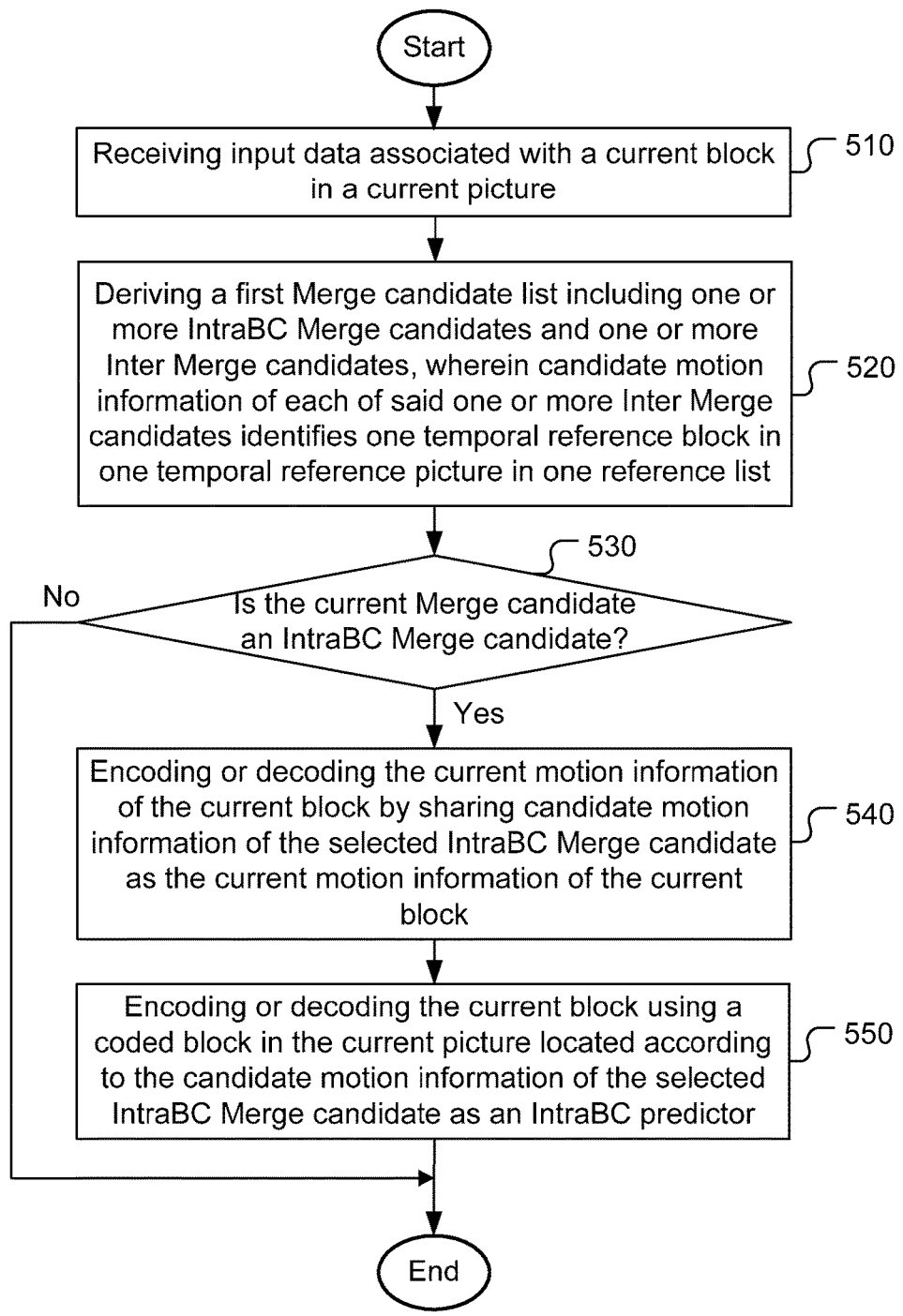
FIG. 5 illustrates a flowchart of an exemplary coding system incorporating an embodiment of the present invention, where the IntraBC Merge candidate is included for the Merge mode.

FIG. 5 illustrates a flowchart of an exemplary coding system incorporating an embodiment of the present invention, where the Merge candidate list includes one or more IntraBC Merge candidates and one or more Inter Merge candidates. The system receives input data associated with a current block in a current picture as shown in step 510. For encoding, the input data corresponds to pixel data to be encoded. For decoding, the input data corresponds to coded pixel data to be decoded. The input data may be retrieved from memory (e.g., computer memory, buffer (RAM or DRAM) or other media) or from a processor. A Merge candidate list including one or more IntraBC Merge candidates and one or more Inter Merge candidates is derived in step 520. The candidate motion information of each of said one or more Inter Merge candidates identifies one temporal reference block in one temporal reference picture in one reference list. A current Merge candidate selected from the Merge candidate list for the current block is checked to see if it is an IntraBC Merge candidate as shown in step 530. If the selected Merge candidate is an IntraBC Merge candidate (i.e., the "yes" path from step 530), steps 540 and 550 are performed. Otherwise (i.e., the "no" path from step 530), steps 540 and 550 are skipped. In step 540, the current motion information of the current block is encoded at the encoder or decoded at the decoder by sharing candidate motion information of the selected IntraBC Merge candidate as the current motion information of the current block. In step 550, the current block is encoded at the encoder or decoded at the decoder using a coded block in the current picture located according to the candidate motion information of the selected IntraBC Merge candidate as an IntraBC predictor.

The flowchart shown above is intended to illustrate examples of IntraBC coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of screen content coding (SCC) and video coding using one or more coding modes including IntraBC mode (Intra-block copy mode) for a picture, wherein the picture is divided into multiple blocks, the method comprising:
   receiving input data associated with a current block in a current picture;
   deriving a first Merge candidate list including one or more IntraBC Merge candidates and one or more Inter Merge candidates, wherein candidate motion information of each of said one or more Inter Merge candidates identifies one temporal reference block in one temporal reference picture in one reference list; and if one IntraBC Merge candidate is selected from the first Merge candidate list for the current block, encoding or decoding current motion information of the current block by sharing candidate motion information of the selected IntraBC Merge candidate as the current motion information of the current block, and encoding or decoding the current block using a coded block in the current picture located according to the candidate motion information of the selected IntraBC Merge candidate as an IntraBC predictor.

2. The method of claim 1, further comprising if one Inter Merge candidate is selected from the first Merge candidate list for the current block, encoding or decoding the current motion information of the current block by sharing candidate motion information of the selected Inter Merge candidate as the current motion information of the current block, and encoding or decoding the current block using a coded block in one temporal reference picture in one reference list located according to the current motion information as an Inter predictor.

3. The method of claim 1, wherein said deriving a first Merge candidate list is based on one or more spatial neighboring blocks, one or more temporal blocks, or both coded either in IntraBC mode or Inter mode.

4. The method of claim 3, wherein if the first Merge candidate list is not full after the first Merge candidate list is derived based on said one or more spatial neighboring blocks, said one or more temporal blocks, or both coded either in IntraBC mode or Inter mode, one or more pre-defined non-zero block vectors, one or more last coded block vectors, or both are added to the first Merge candidate list.

5. The method of claim 4, wherein said one or more non-zero block vectors correspond to one or more elements selected from a pre-defined block vector (BV) group consisting of (−W, 0), (−2W, 0), (0, −H), (0, −2H) and (−W, −H), and wherein W and H correspond to width and height of the current block respectively.

6. The method of claim 4, wherein part of or all of said one or more pre-defined non-zero block vectors, said one or more last coded block vectors, or both are added before one or more bi-predictive Merge candidates, or after said one or more bi-predictive Merge candidates and before one or more zero-valued Merge/AMVP (advanced motion vector predictor) candidates.

7. The method of claim 4, wherein the first Merge candidate list is pruned to remove one or more redundant Merge candidates before or after said one or more pre-defined non-zero block vectors, said one or more last coded block vectors, or both are added to the first Merge candidate list.

8. The method of claim 3, wherein said one or more spatial neighboring blocks coded in the IntraBC mode are restricted to be within a current CTU (coding tree unit) of the current block, or within the current CTU and an above-CTU above the current block.

9. The method of claim 8, wherein block vectors associated with said one or more spatial neighboring blocks coded in the IntraBC mode are stored in a compressed form by storing one block vector for each target block size larger than a minimum block size.

10. The method of claim 1, wherein the candidate motion information or the current motion information includes one or more elements selected from a motion information group consisting of a coding mode, a displacement vector and reference picture information, and wherein the coding mode comprises IntraBC mode and Inter mode, the displacement vector corresponds to one block vector or one motion vector, and the reference picture information includes one reference picture index, one reference picture list or both.

11. The method of claim 1, wherein block vectors associated with said one or more IntraBC Merge candidates are stored by re-using Inter motion vector buffer used to store motion vectors associated with Inter coded blocks.

12. The method of claim 1, further comprising signaling or parsing a first syntax corresponding to a Merge candidate index to select said one IntraBC Merge candidate from the first Merge candidate list when the current block is coded using IntraBC mode.

13. The method of claim 12, when the current block is coded using Inter mode, further comprising signaling or parsing the first syntax corresponding to the Merge candidate index to select one Inter Merge candidate from the first Merge candidate list.

14. The method of claim 1, wherein a syntax related to a maximum number of IntraBC Merge candidates in the first Merge candidate list is incorporated in slice header, PPS (picture parameter set), SPS (sequence parameter set), VPS (video parameter set), slice header SCC (screen content coding) extensions, PPS SCC extensions, SPS SCC extensions, or VPS SCC extensions.

15. A method of screen content coding (SCC) and video coding for a picture, wherein the picture is divided into multiple blocks, the method comprising:

receiving input data associated with a current block in a current picture;

if the current block is coded in Inter mode, signaling or parsing a current motion vector for the current block at an encoder side or a decoder side respectively, and storing the current motion vector in an Inter motion vector buffer, and wherein the current motion vector is used to locate a first coded block in a temporal reference picture and the first coded block is used as an Inter predictor for the current block;

if the current block is coded in IntraBC mode, signaling or parsing a current block vector for the current block at the encoder side or the decoder side respectively, and storing the current block vector by reusing the Inter motion vector buffer, and wherein the current block vector is used to locate a second coded block in the current picture and the second coded block is used as an IntraBC predictor; and providing one or more motion vectors and one or more block vectors stored in the Inter motion vector buffer for encoding or decoding one or more subsequent blocks.

16. The method of claim 15, wherein when the current block vector is stored in the Inter motion vector buffer, reusing the Inter motion vector buffer by the current block vector is indicated by setting a reference picture index for the current block to −1, unavailable, or a value equal to or larger than a number of reference pictures in a reference list, or setting Inter prediction direction, interDir to zero.

17. An apparatus for screen content coding (SCC) and video coding using one or more coding modes including IntraBC mode (Intra-block copy mode) for a picture, wherein the picture is divided into multiple blocks, the apparatus comprising one or more electronic circuits configured to:

receive input data associated with a current block in a current picture;

derive a first Merge candidate list including one or more IntraBC Merge candidates and one or more Inter Merge candidates, wherein candidate motion information of each of said one or more Inter Merge candidates identifies one temporal reference block in one temporal reference picture in one reference list; and if one IntraBC Merge candidate is selected from the first Merge candidate list for the current block, encode or decode current motion information of the current block by sharing candidate motion information of the selected IntraBC Merge candidate as the current motion information of the current block, and encode or decode the current block using a coded block in the current picture located according to the candidate motion information of the selected IntraBC Merge candidate as an IntraBC predictor.

* * * * *